United States Patent Office 3,714,161
Patented Jan. 30, 1973

3,714,161
MORPHOLINE DERIVATIVES
Keith Blakeney Mallion, Ralph William Turner, and Alexander Henry Todd, Macclesfield, England, assignors to Imperial Chemical Industries Limited, London, England
No Drawing. Filed Nov. 24, 1967, Ser. No. 685,302
Claims priority, application Great Britain, Dec. 28, 1966, 57,963/66
Int. Cl. C07d 87/32
U.S. Cl. 260—247.7 C        2 Claims

ABSTRACT OF THE DISCLOSURE

The disclosure relates to new 2 - aryloxymethylmorpholine derivatives which possess central nervous depressant action, and some of which also possess thymoleptic activity, and to processes for the manufacture of the said morpholine derivatives and to pharmaceutical compositions containing them. Typical of the morpholine derivatives disclosed is 2-(o-ethoxyphenoxymethyl)-morpholine.

This invention relates to new morpholine derivatives which possess valuable therapeutic properties, for example they possess depressant action on the central nervous system of warm-blooded animals as demonstrated by the reduction of spontaneous motility of mice and the prevention of electroshock-induced convulsions in mice, and they are therefore useful in the treatment of anxiety, neurotic states and epilepsy in man. Furthermore, some of the compounds also possess thymoleptic (anti-depressant) activity in warm-blooded animals as demonstrated by the reversal of reserpine-induced hypothermia in mice, and these compounds are therefore useful in the treatment or prophylaxis of depressive illness in man, According to the invention we provide new morpholine derivatives of the formula:

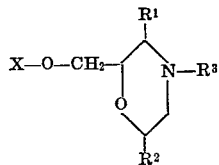

wherein $R^1$ and $R^2$, which may be the same or different, stand for hydrogen or for alkyl radicals, wherein $R^3$ stands for hydrogen or for an alkyl, alkenyl or cycloalkyl radical, and wherein X stands for an aryl radical which may optionally be substituted, and the acid-addition salts thereof.

It is to be understood that the above definition of morpholine derivatives encompasses all possible stereoisomers thereof, and mixtures thereof.

As a suitable value for $R^1$ or $R^2$ when it stands for an alkyl radical there may be mentioned, for example, an alkyl radical of not more than 3 carbon atoms, for example the methyl radical.

As a suitable value for $R^3$ when it stands for an alkyl radical there may be mentioned, for example, an alkyl radical of not more than 6 carbon atoms, for example the methyl, ethyl, isopropyl, n-proply, s-butyl or t-butyl radical.

As a suitable value for $R^3$ when it stands for an alkenyl radical there may be mentioned, for example, an alkenyl radical of not more than 6 carbon atoms, for example the allyl radical.

As a suitable value for $R^3$ when it stands for a cycloalkyl radical there may be mentioned, for example, a cycloalkyl radical of not more than 5 carbon atoms, for example the cyclopropyl, cyclobutyl or cyclopentyl radical.

As a suitable value for X there may be mentioned, for example, a phenyl or naphthyl radical which may optionally be substituted by one or more substituents, and particularly one or two substituents, selected from halogen atoms, for example fluorine, chlorine and bromine atoms; alkyl, alkoxy and alkylthio radicals, for example alkyl, alkoxy and alkylthio radicals of not more than 10 carbon atoms, for example methyl, ethyl, isopropyl, n-butyl, t-butyl, t-amyl, methoxy, ethoxy, n-propoxy, isopropoxy, n-butoxy, isobutoxy, n-heptyloxy and methylthio radicals; halogenoalkyl and halogenoalkoxy radicals, for example halogenoalkyl and halogenoalkoxy radicals of not more than 5 carbon atoms, for example trifluoromethyl and 2,2-dichloro-1,1-difluoroethoxy radicals; alkenyl, alkenyloxy, alkynyloxy and cycloalkoxy radicals, for example alkenyl, alkenyloxy, alkynyloxy and cycloalkoxy radicals of not more than 6 carbon atoms, for example allyl, allyloxy, propargyloxy and cyclopentyloxy radicals; aryl, aryloxy, alkylaryloxy, aralkyl and aralkoxy radicals, for example aryl, aryloxy, alkylaryloxy, aralkyl and aralkoxy radicals each of not more than 10 carbon atoms, for example phenyl, phenoxy, 4-tolyloxy, benzyl and benzyloxy radicals; alkoxyalkyl radicals, for example alkyl radicals of not more than 5 carbon atotms substituted by alkoxy radicals of not more than 5 carbon atoms, for example methoxymethyl, ethoxymethyl and n-propoxymethyl radicals; and hydroxy and methylenedioxy radicals.

Alternatively, the aryl radical X may be indanyl or tetrahydronaphthyl radical, for example the 4-indanyl, 5-indanyl, 5,6,7,8-tetrahydro-1-naphthyl or 5,6,7,8-tetrahydro-2-naphthyl radical, which radicals may optionally bear one or more, and particularly one or two halogen, alkyl or alkoxy substituents, for example chlorine or bromine atoms or alkyl or alkoxy radicals each of not more than 3 carbon atoms, for example methyl, ethyl, methoxy or ethoxy radicals.

A preferred group of compounds which possess thymoleptic (anti-depressant) activity comprises compounds of the formula given above wherein $R^1$ and $R^2$ both stand for hydrogen, wherein $R^3$ stands for hydrogen, or for an alkyl radical of not more than 3 carbon atoms, or for the allyl radical, and wherein X stands for a phenyl radical which bears a single substituent in the 2-position of the nucleus, and the acid-addition salts thereof. Suitable substituents in the 2-position are, for example, those substituents mentioned above as optional substituents in the phenyl or naphthyl radical X. Particularly preferred compounds of this group have the formula given above wherein $R^1$, $R^2$ and $R^3$ all stand for hydrogen and wherein X stands for a phenyl radical which bears as single substituent in the 2-position a halogen atom, for example the chlorine atom, or an alkyl, alkoxy or alkenyloxy radical each of not more than 6 carbon atoms, for example the methyl, ethyl, methoxy, ethoxy, n-propoxy or allyloxy radical, or the phenyl or phenoxy radical.

The particular preferred compound which possesses thymolpetic activity is 2-(o-ethoxyphenoxymethyl)morpholine.

Particular new morpholine derivatives of the invention are, for example:

4-isopropyl-2-(naphth-1-yloxymethyl)morpholine;
4-isopropyl-2-(m-tolyloxymethyl)morpholine;
2-(naphth-1-yloxymethyl)-4-t-butylmorpholine;
2-o-ethoxyphenoxymethyl-4-isopropylmorpholine;
2-(naphth-1-yloxymethyl)morpholine;
4-allyl-2-(naphth-1-yloxymethyl)morpholine;
4-methyl-2-(naphth-1-yloxymethyl)morpholine;
2-(o-ethoxyphenoxymethyl)morpholine;
2-(o-methoxyphenoxymethyl)morpholine;
2-(o-phenoxyphenoxymethyl)morpholine;
2-(o-tolyloxymethyl)morpholine;
2-(o-n-propoxyphenoxymethyl)morpholine;
2-phenoxymethylmorpholine;
2-(p-methoxyphenoxymethyl)morpholine;
2-(m-methoxyphenoxymethyl)morpholine;
2-(2,6-dimethoxyphenoxymethyl)morpholine;
2-(o-hydroxyphenoxymethyl)morpholine;
2-(o-n-heptyloxyphenoxymethyl)morpholine;
2-(o-isopropoxyphenoxymethyl)morpholine;
2-(o-allyloxyphenoxymethyl)-4-isopropylmorpholine;
2-(o-allyloxyphenoxymethyl)morpholine;
4-cyclopentyl-2-(naphth-1-yloxymethyl)morpholine;
4-isopropyl-2-(5,6,7,8-tetrahydronaphth-1-yloxymethyl)morpholine;
4-isopropyl-2-(3,4-methylenedioxyphenoxymethyl)morpholine;
2-(4-indanyloxymethyl)-4-isopropylmorpholine;
4-isopropyl-2-(m-trifluoromethylphenoxymethyl)morpholine;
4-allyl-2-(o-ethoxyphenoxymethyl)morpholine;
2-(4-biphenylyloxymethyl)-4-isopropylmorpholine;
2-(o-chlorophenoxymethyl)-4-isopropylmorpholine;
2-(o-ethoxyphenoxymethyl)-3-methylmorpholine;
4-isopropyl-6-methyl-2-(naphth-1-yloxymethyl)morpholine;
2-(o-chlorophenoxymethyl)morpholine;
2-(o-methylthiophenoxymethyl)morpholine; and
2-(o-allylphenoxymethyl)morpholine and the acid-addition salts thereof.

As suitable acid-addition salts of the morpholine derivatives of the invention there may be mentioned, for example, acid-addition salts derived from an inorganic or organic acid, for example hydrochlorides, hydrobromides, phosphates, sulphates, oxalates, lactates, tartrates, acetates, gluconates, salicylates, citrates, ascorbates, benzoates, β-naphthoates, adipates or 1,1-methylene-bis-(2-hydroxy-3-naphthoates) or acid-addition salts derived from acidic synthetic resins, for example sulphonated polystyrene resins, for example "Zeo-Karb" 225 ("Zeo-Karb" is a trademark).

According to a further feature of the invention we provide a process for the manufacture of the morpholine derivatives of the invention, and the acid-addition salts thereof, which comprises the reduction of a compound of the formula:

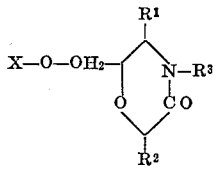

wherein $R^1$, $R^2$, $R^3$ and X have the meanings stated above, with a complex metal hydride, whereafter if desired the product in free base form is reacted with an acid to form an acid-addition salt thereof.

The complex metal hydride may be, for example, an alkali metal aluminium hydride, for example lithium aluminium hydride. The reduction may be carried out in an inert diluent or solvent, for example ether, tetrahydrofuran or 1,2-dimethoxyethane, and it may be accelerated or completed by the application of heat, for example by heating to the boiling point of the diluent or solvent.

The starting material for the above process may be obtained by the interaction of a compound of the formula:

$$X-O-CH_2 \cdot CHOH \cdot CHR^1 \cdot NHR^3$$

wherein $R^1$, $R^3$ and X have the meanings stated above, with a compound of the formula $ZCHR^2COZ^1$, wherein $R^2$ has the meaning stated above, and wherein Z and $Z^1$, which may be the same or different, stand for halogen atoms, for example chlorine or bromine atoms, followed by the cyclisation of the compound of the formula $$X-O-CH_2 \cdot CHOH \cdot CHR^1 \cdot NR^3 \cdot COCHR^2Z$$

thus obtained. The compound of the formula:

$$X-O-CH_2 \cdot CHOH \cdot CHR^1 \cdot NHR^3$$

may itself be obtained by the interaction of a phenol of the formula X—OH, wherein X has the meaning stated above, with an epihalohydrin of the formula:

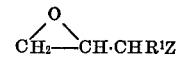

wherein $R^1$ and Z have the meanings stated above, followed by the interaction of the product thus obtained with an amine of the formula $R^3NH_2$, wherein $R^3$ has the meaning stated above, as generally described in United Kingdom patent specifications Nos. 994,918, 1,023,214 and 1,069,345.

According to a further feature of the invention we provide a process for the manufacture of those of the morpholine derivatives of the invention, and the acid-addition salts thereof, wherein $R^3$ stands for hydrogen which comprises the removal of the α-aryl-alkyl radical from an α-aryl-alkyl derivative of the formula:

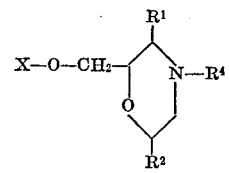

wherein $R^1$, $R^2$ and X have the meanings stated above and wherein $R^4$ stands for an α-aryl-alkyl radical, whereafter if desired the product in free base form is reacted with an acid to form an acid-addition salt thereof.

As a suitable value for $R^4$ there may be mentioned, for example, the benzyl radical.

The α-aryl-alkyl radical may be removed by catalytic hydrogenolysis, for example by means of hydrogen in the presence of a palladium-on-charcoal catalyst, in a diluent or solvent. The catalytic hydrogenolysis is conveniently carried out at ambient temperature and at atmospheric pressure, and is conveniently accelerated by the presence of an acidic catalyst, for example hydrochloric acid.

Alternatively, the α-aryl-alkyl radical may be removed by the interaction of the compound of the formula fo given above with an alkyl chloroformate, for example methyl or ethyl chloroformate, during which interaction the α-aryl-alkyl radical is replaced by an alkoxycarbonyl radical, for example the methoxycarbonyl or ethoxycarbonyl radical. The said alkoxycarbonyl radical may then be removed by hydrolysis of the alkoxycarbonyl derivative obtained as intermediate.

The interaction of the α-aryl-alkyl derivative with the alkyl chloroformate may be carried out in a diluent or solvent, for example benzene, and it may be accelerated or completed by the application of heat, for example by heating to the boiling point of the diluent or solvent.

The hydrolysis of the alkoxycarbonyl derivative may be carried out by means of an alkali, for example sodium or potassium hydroxide, and it may be carried out in aqueous diluent or solvent, for example water, aqueous methanol or aqueous ethanol. The hydrolysis may be accelerated or completed by the application of heat, for example by heating to the boiling point of the diluent or solvent.

It is to be understood that if the aryl radical X contains a reactive substituent, for example an unsaturated substituent, for example an alkenyl, alkenyloxy or alkynyloxy radical, or a hydrogenolysable substituent, for example the benzyloxy radical, or a halogen substituent, for example the chlorine atom, and if the α-aryl-alkyl radical is removed by catalytic hydrogenolysis, then the reactive substituent may itself be modified. Thus, an alkenyl radical may be reduced to an alkyl radical; an alkenyloxy or alkynyloxy radical may be reduced to an alkoxy radical; the benzyloxy radical may be hydrogenolysed to the hydroxy radical; and the chlorine atom may be replaced by the hydrogen atom. Accordingly, if a reactive substituent as defined above is present in the aryl radical X, or if an alkylthio substituent which might poison a catalyst is present in the aryl radical X, the alternative procedure using an alkyl chloroformate is preferred for the removal of the α-aryl-alkyl radical.

The α-aryl-alkyl derivative used as starting material in the abovementioned process may be obtained by the reduction of the corresponding morpholin-5-one derivative with a complex metal hydride, for example lithium aluminium hydride, by a similar process to that described above for the manufacture of the morpholine derivatives of the invention.

According to a further feature of the invention we provide pharmaceutical compositions which comprise as active ingredient at least one of the morpholine derivatives of the invention or an acid-addition salt thereof, in association with a pharmaceutically-acceptable diluent or carrier therefor.

The pharmaceutical compositions may be, for example, in a form suitable for oral or parenteral administration, for which purposes they may be formulated by means known to the art into the form of, for example, tablets, capsules, aqueous or oily solutions or suspensions, emulsions, injectable aqueous or oily solutions or suspensions, or dispersible powders.

The pharmaceutical compositions of the invention may also contain, in addition to the morpholine derivative or salt thereof, one or more known drugs selected from neuroleptic agents, for example chlorpromazine, prochlorperazine, trifluoperazine and haloperidol; other sedative drugs and tranquilizers, for example chlorodiazepoxide, phenobarbitone and amylobarbitone; anticonvulsant drugs, for example primidone and phenytoin; β-adrenergic blocking agents, for example propranolol; drugs used in the treatment of Parkinson's disease, for example benzhexol; and other antidipressant drugs, for example imipramine, desipramine, amitriptyline, nortriptyline, drugs of the amphetamine type and monoamine-oxidase inhibitors, for example phenelzine and mebanazine.

Preferred pharmaceutical compositions of the invention are those suitable for oral administration in unit dosage form, for example tablets and capsules, which contain between 10 and 100 mg. of active ingredient.

The pharmaceutical compositions of the invention will normally beadiministered to man, both for the treatment of anxiety and neurotic states and for the treatment or prophylaxis of depressive illness, at such a dose that each patient receives a total of between 5 and 400 mg. of active ingredient per day, and preferably, if a highly active compound is used, a total of between 5 and 40 mg. per day, the composition being administered 3 or 4 times per day.

The invention is illustrated but not limited by the following examples in which the parts are by weight:

EXAMPLE 1

A mixture of 20 parts of 4-isopropyl-2-(naphth-1-yloxymethyl)morpholin-5-one, 5 parts of lithium aluminium hydride and 1,000 parts of ether is heated under reflux for 6 hours. The mixture is cooled, 100 parts of ethyl acetate are added dropwise, and the mixture is then heated under reflux for 10 minutes. 1,000 parts of water are added, and the organic phase is separated, washed with water and dried. A 1% ethereal solution of oxalic acid is added until precipitation of solid is complete, and the mixture is filtered. The solid residue is crystallised from butyl acetate and there is thus obtained 4-isopropyl-2-(naphth-1-yloxymethyl)morpholine hydrogen oxalate, M.P. 143–145° C.

The 4-isopropyl-2-(naphth-1-yloxymethyl)morpholin-5-one used as starting material may be obtained as follows:

A solution of 75 parts of 1-isopropylamino-3-(naphth-1-yloxy)-2-propanol in 1,500 parts of ethylene chloride is added to a solution of 12 parts of sodium hydroxide in 600 parts of water. The mixture is cooled to −5° C. and is vigorously agitated to ensure thorough mixing of the two phases. 25 parts of chloroacetyl chloride are added dropwise during 30 minutes at such a rate that the temperature does not rise above 0° C., and the mixture is then stirred at ambient temperature for 3 hours. The organic phase is separated, washed with 10% aqueous hydrochloric acid and then with water, and is dried and evaporated to dryness.

A solution of 86 parts of the N-(2-hydroxy-3-naphth-1′ - yloxypropyl) - N-isopropylchloroacetamide thus obtained as residue in 1,000 parts of methanol is added to a solution of 6 parts of sodium in 1,000 parts of methanol and the mixture is heated under reflux for 6 hours. The mixture is evaporated to dryness and the residue is shaken with 2,000 parts of ether and 1,000 parts of 10% aqueous hydrochloric acid. The ethereal layer is separated, dried and evaporated to dryness and the residue is crystallised from petroleum ether (B.P. 80–100° C.). There is thus obtained 4 - isopropyl-2-(naphth-1-yloxymehyl)-morpholin-5-one, M.P. 110.5–111.5° C.

EXAMPLE 2

A mixture of 40 parts of 2-o-ethoxyphenoxymethyl-4-isopropylmorpholin-5-one, 15 parts of lithium aluminium hydride and 2,000 parts of ether is heated under reflux for 6 hours. The mixture is cooled, 100 parts of ethyl acetate are added dropwise, and the mixture is then heated under reflux for 10 minutes. 1,000 parts of water are added, and the organic phase is separated, washed with water and dried. An ethereal solution of hydrogen chloride is added until precipitation of solid is complete, and the mixture is filtered. The solid residue is crystallised from butyl acetate and there is thus obtained 2-o-ethoxyphenoxymehtyl - 4 - isopropylmorpholine hydrochloride, M.P. 158–160° C.

The 2-o-ethoxyphenoxymethyl-4-isopropylmorpholin-5-one used as starting material may be obtained as follows:

A solution of 44 parts of chloroacetyl chloride in 500 parts of ether is added gradually during 30 minutes to a stirred solution of 100 parts of 3-o-ethoxyphenoxy-1-isopropylamino-2-propanol and 44 parts of triethylamine in 4,000 parts of ether. The mixture is stirred at ambient temperature for 24 hours and then filtered, and the filtrate is evaporated to dryness.

A solution of 133 parts of the N-(2-hydroxy-3-o-ethoxyphenoxypropyl) - N - isopropylchloroacetamide thus obtained in 500 parts of methanol is added gradually during 30 minutes to a solution of 9.3 parts of sodium in 2,000 parts of methanol. The mixture is heated under reflux for 6 hours and then evaporated to dryness. The residue is shaken with 1,000 parts of ether and 500 parts of 10% aqueous hydrochloric acid, and the organic phase is separated, washed with water, dried and evaporated to dryness.

There is thus obtained 2-o-ethoxyphenoxymethyl-4-isopropylmorpholin-5-one as an oil.

EXAMPLE 3

The process described in Example 2 is repeated except that 2 - (naphth-1-yloxymethyl)-4-t-butylmorpholin-5-one is used as starting material in place of 2-o-ethoxyphenoxymethyl-4-isopropylmorpholin-5-one. The solid product is crystallised from ethanol and there is thus obtained 2-(naphth - 1 - yloxymethyl-4-t-butylmorpholine hydrochloride, M.P. 118–121° C.

The 2 - (naphth-1-yloxymethyl)-4-t-butylmorpholin-5-one used as starting material may be obtained as follows:

40 parts of triethylamine are added to a stirred solution of 100 parts of 3-(naphth-1-yloxy-1-t-butylamino-2-propanol in 4,000 parts of ether. A solution of 41 parts of chloroacetyl chloride in 500 parts of ether is then added gradually to the stirred mixture during 30 minutes, and the mixture is stirred at ambient temperature for 24 hours and is then filtered. The filtrate is washed with 5% aqueous hydrochloric acid, then with water, and is dried and evaporated to dryness.

A solution of 122 parts of the N-(2-hydroxy-3-naphth-1'-yloxymethyl)-N-t-butylchloroacetamide thus obtained in 500 parts of methanol is added to a solution of 8 parts of sodium in 2,000 parts of methanol. The mixture is heated under reflux for 6 hours and is then evaporated to dryness. The residue is shaken with 500 parts of 10% aqueous hydrochloric acid and 2,000 parts of ether and the ethereal solution is separated, washed with water, dried and evaporated to dryness. There is thus obtained 2-(naphth - 1-yloxymethyl)-4-t-butymorpholin-5-one as an oil.

EXAMPLE 4

The process described in Example 2 is repeated except that 4 - isopropyl - 2-m-tolyloxymethylmorpholin-5-one is used as starting material in place of 2-o-ethoxyphenoxymethyl-4-isopropylmorpholin-5-one. The solid product is crystallised from ethyl acetate and there is thus obtained 4-isopropyl-2-m-tolyloxymethylmorpholine hydrochloride, M.P. 174–175° C.

The 4 - isopropyl-2-m-tolyloxymethylmorpholin-5-one used as starting material may be obtained as an oil by the procedure described in the second part of Example 3, except that 1-isopropylamino-3-m-tolyloxy-2-propanol is used as starting material in place of 3-(naphth-1-yloxy)-1-t-butylamino-2-propanol.

EXAMPLE 5

A solution of 17.5 parts of 4-benzyl-2-(naphth-1-yloxymethyl)morpholine and 0.5 part of concentrated aqueous hydrochloric acid in 400 parts of ethanol is shaken with 7.5 parts of a 5% palladium-on-charcoal catalyst in an atmosphere of hydrogen at ambient temperature and atmospheric pressure until the uptake of hydrogen ceases. The mixture is filtered and the filtrate is evaporated to dryness. The residue is dissolved in 100 parts of ethyl acetate and a solution of 4 parts of oxalic acid dihydrate in 100 parts of ethyl acetate is added. The mixture is filtered and the solid residue is crystallised from a mixture of methanol and ethyl acetate. There is thus obtained 2-(naphth-1-yloxymethyl)morpholine hydrogen oxalate, M.P. 160°–162° C.

The 4 - benzyl - 2-(naphth-1-yloxymethyl)morpholine used as starting material may be obtained as follows:

A solution of 37 parts of chloroacetyl chloride in 330 parts of methylene chloride and a solution of 33 parts of triethylamine in 330 parts of methylene chloride are separately and simultaneously added during 30 minutes to a solution of 100 parts of 1-benzylamino-3-(naphth-1-yloxy)-2-propanol in 2,000 parts of methylene chloride which is stirred at a temperature of 0° C. The mixture is stirred at ambient temperature for 17 hours and is then washed successively with 2,500 parts of 10% aqueous hydrochloric acid and 2,500 parts of water, dried and evaporated to dryness.

A solution of 121 parts of the N-benzyl-N-(2-hydroxy-3-naphth-1'-yloxypropyl)chloroacetamide thus obtained as residue in 600 parts of methanol is added to a stirred solution of 7.5 parts of sodium in 600 parts of methanol, and the mixture is stirred and heated under reflux for 6 hours. The mixture is then stirred at ambient temperature for 16 hours and evaporated to dryness, and the residue is shaken with 2,500 parts of 10% aqueous hydrochloric acid and 2,000 parts of ether. The organic phase is separated, washed with water, dried and evaporated to dryness. The residue is crystallised from petroleum ether (B.P. 100–120° C.) and there is thus obtained 4-benzyl-2 - (naphth-1-yloxymethyl)morpholin-5-one, M.P. 89.5–91° C.

A suspension of 18 parts of lithium aluminium hydride in 700 parts of ether is added gradually to a stirred suspension of 54 parts of 4-benzyl-2-(naphth-1-yloxymethyl)morpholin-5-one in 1070 parts of ether, and the mixture is then stirred and heated under reflux for 3 hours. 2,000 parts of water are gradually added, and the organic phase is separated and extracted with 2,000 parts of a 10% aqueous hydrochloric acid. The extract is made alkaline with 20% aqueous sodium hydroxide solution and the mixture is extracted with ethyl acetate. The extract is washed with water and dried, and ethereal hydrogen chloride solution is added until precipitation of solid is complete. The mixture is filtered and the solid residue is crystallized from methanol. There is thus obtained 4-benzyl-2-(naphth - 1 - yloxymethylmorpholine hydrochloride, which melts between 170 and 230° C.

EXAMPLE 6

The process described in the last part of Example 5 is repeated except that 4-allyl-2-(naphth-1-yloxymethyl) morpholin-5-one is used as starting material in place of 4 - benzyl-2-(naphth-1-yloxymethyl)morpholin - 5 - one, and that ethereal oxalic acid solution is used in place of ethereal hydrogen chloride solution during the isolation procedure. The solid product is crystallised from methanol and there is thus obtained 4-allyl-2-(naphth-1-yloxymethyl)morpholine hydrogen oxalate, M.P. 210–212° C.

The 4-allyl-2-(naphth - 1 - yloxymethyl)morpholin-5-one used as starting material may be obtained as a solid, M.P. 112.5–114° C. after crystallisation from petroleum ether (B.P. 100–120° C.), by the procedure described in the second and third parts of Example 5 except that 1-allylamino-3-(naphth-1-yloxy) - 2 - propanol is used as starting material in place of 1-benzylamino-3-(naphth-1-yloxy)-2-propanol.

EXAMPLE 7

The process described in Example 6 is repeated except that 4 - methyl-2-(naphth-1-yloxymethyl)morpholin-5-one is used as starting material in place of 4-allyl-2-(naphth-1-yloxymethyl)morpholin-5-one. The solid product is crystallised from a mixture of methanol and ethyl acetate and there is thus obtained 4-methyl-2-(naphth-1-yloxymethyl)morpholine hydrogen oxalate, M.P. 180–182° C.

The 4-methyl-2-(naphth-1-yloxymethyl)morpholin - 5- one used as starting material may be obtained as a solid, M.P. 105–107° C. after crystallisation from petroleum ether (B.P. 100–120° C.), by the procedure described in the second and third parts of Example 5 except that 1-methylamino-3-(naphth-1-yloxy) - 2 - propanol (M.P. 94–96° C., prepared from a 1,2-epoxy - 3 - (naphth-1-yloxy)propane and methylamine) is used as starting material in place of 1 - benzylamino-3-(naphth-1-yloxy)-2-propanol.

EXAMPLE 8

The process described in Example 5 is repeated except that the appropriate 4-benzyl-2-aryloxymethylmorpholine is used as starting material in place of 4-benzyl-2-(naphth- 1-yloxymethyl)morpholine. There are thus obtained the compounds described in the following table:

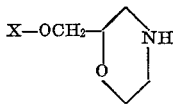

| X | Salt | M.P. (° C.) |
|---|---|---|
| 2-ethoxyphenyl | Hydrogen oxalate | 106-108 |
| 2-methoxyphenyl | Oxalate | 192-194 |
| 2-phenoxyphenyl | Hydrogen oxalate | 158-160 |
| 2-tolyl | do | 117-120 |
| 2-n-propoxyphenyl | do | [1] 133-135 |
| Phenyl | do | [2] 132-134 |
| 4-methoxyphenyl | do | 146-149.5 |
| 3-methoxyphenyl | do | 159-161 |
| 2,6-dimethoxyphenyl | do | 153-156 |
| 2-hydroxyphenyl | Free base | [3] 157-158 |
| 2-n-heptyloxyphenyl | Hydrogen oxalate | 97-99 |

[1] 2-(o-allyloxyphenoxymethyl)-4-benzylmorpholine used as starting material, the allyl radical being reduced to the n-propyl radical during hydrogenolysis.
[2] 4-benzyl-2-(o-chlorophenoxymethyl)morpholine used as starting material, the chlorine atom being replaced by hydrogen during hydrogenolysis.
[3] 4-benzyl-2-(o-benzyloxyphenoxymethyl)morpholine used as starting material, the benzyloxy radical being reduced to the hydroxy radical during hydrogenolysis.

The 4-benzyl - 2 - aryloxymethylmorpholine derivatives used as starting materials in the above process may be obtained by similar processes to those described in the second, third and fourth parts of Example 5, except that the appropriate 1-benzylamino-3-aryloxy-2-propanol derivatives are used as starting material.

The 1-benzylamino-3-aryloxy - 2 - propanol derivatives themselves may be obtained by the condensation of the appropriate phenols with epichlorohydrin, followed by the interaction of the products thus obtained with benzylamine. Some of the said 1-benzylamino-3-aryloxy-2-propanol derivatives are known compounds, and some of them have not been characterised. 1-benzylamino-3-(o-ethoxyphenoxy)-2-propanol has M.P. 77–79° C. and 1-benzylamino-3-(o-allyloxyphenoxy) - 2 - propanol has M.P. 87–90° C.

EXAMPLE 9

A solution of 10.4 parts of 2-(o-allyloxyphenoxymethyl)-4-isopropylmorpholin-5-one in 100 parts of dry ether is added gradually to a stirred suspension of 1.4 parts of lithium aluminium hydride in 150 parts of dry ether, and the mixture is stirred and heated under reflux for 3 hours, and then stirred for a further 14 hours at ambient temperature. 15 parts of water are gradually added, and the organic phase is separated and extracted with 200 parts of 10% aqueous hydrochloric acid. The acidic extract is made alkaline with 45% aqueous sodium hydroxide solution and the mixture is extracted with ethyl acetate. The organic extract is washed with water, dried and evaporated to dryness. The residue is dissolved in 10 parts of ethyl acetate, and a solution of 2.5 parts of oxalic acid dihydrate in 10 parts of ethyl acetate is added. The mixture is filtered and the solid residue is crystallized from a mixture of methanol and ethyl acetate. There is thus obtained 2-(o-allyloxyphenoxymethyl)-4-isopropylmorpholine hydrogen oxalate, M.P. 132–134° C.

The 2-(o-allyloxyphenoxymethyl) - 4 - isopropylmorpholin-5-one used as a starting material may be obtained as follows:

A solution of 4.5 parts of chloroacetyl chloride in 25 parts of methylene chloride and a solution of 4.3 parts of triethylamine in 25 parts of methylene chloride are separately and simultaneously added during 30 minutes to a stirred solution of 11 parts of 3-(o-allyloxyphenoxy)-1-isopropylamino-2-propanol in 150 parts of methylene chloride. The mixture is stirred at ambient temperature for 17 hours, and is then washed successively with 200 parts of 10% aqueous hydrochloric acid and 200 parts of water, dried, and evaporated to dryness.

A solution of 12.6 parts of the N-[2-hydroxy-3-(o-allyloxyphenoxy)propyl]-N-isopropylchloroacetamide thus obtained as residue in 75 parts of dry methanol is added to a stirred solution of 1.48 parts of sodium in 75 parts of dry methanol, and the mixture is stirred and heated under reflux for 6 hours. The mixture is then stirred at ambient temperature for 11 hours and evaporated to dryness, and the residue is shaken with 200 parts of 10% aqueous hydrochloric acid and 200 parts of ethyl acetate. The organic phase is separated, washed with water, dried and evaporated to dryness. There is thus obtained 2-(o-allyloxyphenoxymethyl)-4-isopropylmorpholin-5-one as an oil.

EXAMPLE 10

The process described in Example 9 is repeated except that the appropriate 2-aryloxymethylmorpholin-5-one is used as starting material in place of 2-(o-allyloxyphenoxymethyl)-4-isopropylmorpholin-5-one. There are thus obtained the compounds described in the following table:

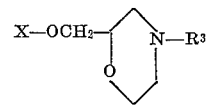

| X | R³ | M.P. (° C.) of hydrogen oxalate salt |
|---|---|---|
| 2-allyloxyphenyl | Hydrogen | 115-118 |
| 1-naphthyl | Cyclopentyl | 163-165 |
| 5,6,7,8-tetrahydro-1-naphthyl | Isopropyl | 166-168 |
| 3,4-methylenedioxyphenyl | do | 157-159 |
| 4-indanyl | do | 134-138 |
| 3-trifluoromethylphenyl | do | 134-136 |
| 2-ethoxyphenoxy | Allyl | 128-129 |
| 4-biphenylyl | Isopropyl | 180-181 |
| 2-chlorophenyl | do | 117-118 |
| 2-isopropoxyphenyl | Hydrogen | [1] 96-103 |

[1] Contains one molecule of methanol of crystallisation.

The 2-aryloxymethylmorpholin-5-one derivatives used as starting materials in the above process may be obtained by similar processes to those described in the second and third parts of Example 9, except that the appropriate 1-amino-3-aryloxy-2-propanol derivatives are used as starting materials.

The 1-amino-3-aryloxy - 2 - propanol derivatives themselves may be obtained by the condensation of the appropriate phenols with epichlorohydrin, followed by the interaction of the products thus obtained with ammonia or with the appropriate amines. 3-(o-allyloxyphenoxy)-1-amino-2-propanol has M.P. 57–60° C.

EXAMPLE 11

The process described in Example 5 is repeated except that 4-benzyl-2-(o - ethoxyphenoxymethyl)-3-methylmorpholine is used as starting material in place of 4-benzyl-2-(naphth-1-yloxymethyl)-morpholine. There is thus obtained 2-(o - ethoxyphenoxymethyl)-3-methylmorpholine as an oil, the structure of which is confirmed by infra-red spectroscopy.

The 4-benzyl-2-(o-ethoxyphenoxymethyl) - 3 - methylmorpholine used as starting material may be obtained, by similar processes to those described in the second, third and fourth parts of Example 5, by the reaction of o-ethoxyphenol successively with 3-chloro 1,2-epoxybutane, benzylamine and chloroacetyl chloride, followed by cyclisation of the product obtained with sodium methoxide and reduction of the product then obtained with lithium aluminium hydride.

EXAMPLE 12

A solution of 4 parts of 4-isopropyl-6-methyl-2-(naphth-1-yloxymethyl)morpholin-5-one in 100 parts of dry ether is added gradually to a stirred suspension of 1 part of lithium aluminium hydride in 100 parts of dry ether, and the mixture is stirred and heated under reflux for 3 hours, and then stirred for a further 14 hours at ambient temperature. 15 parts of water are gradually added and the organic phase is separated and extracted with 200 parts of 10% aqueous hydrochloric acid. The acidic extract is made alkaline with 45% aqueous sodium hydroxide solution and the mixture is extracted with ethyl acetate.

The organic extract is washed with water, dried, and evaporated to dryness. The residue is dissolved in 10 parts of ethyl acetate and an ethereal solution of hydrogen chloride is added until precipitation of the solid is complete. The mixture is filtered and the solid residue is crystallised from a mixture of methanol and ethyl acetate. There is thus obtained 4-isopropyl-6-methyl-2-naphth - 1 - yloxymethyl)morpholine hydrochloride, M.P. 199–205° C.

The 4 - isopropyl-6-methyl-2-(naphth-1-yloxymethyl)-morpholine-5-one used as starting material may be obtained as follows:

A solution of 3.6 parts of 2-bromopropionyl chloride in 25 parts of methylene chloride and a solution of 2.15 parts of triethylamine in 25 parts of methylene chloride are separately and simultaneously added during 30 minutes to a stirred solution of 6 parts of 1-isopropylamino-3-(naphth-1-yloxy)-2-propanol in 150 parts of methylene chloride. The mixture is stirred at ambient temperature for 17 hours and is then washed successively with 200 parts of 10% aqueous hydrochloric acid and 200 parts of water, dried, and evaporated to dryness.

A solution of 8.05 parts of the N-(2-hydroxy-3-naphth-1'-yloxypropyl)-N-isopropyl-2-bromopropionamide thus obtained as residue in 75 parts of dry methanol is added to a stirred solution of 0.5 part of sodium in 75 parts of dry methanol and the mixture is stirred and heated under reflux for 6 hours, and then stirred for a further 11 hours at ambient temperature. The mixture is evaporated to dryness and the residue is shaken with 200 parts of 10% aqueous hydrochloric acid and 200 parts of ethyl acetate. The organic phase is separated, washed with water, dried and evaporated to dryness. There is thus obtained 4-isopropyl-6-methyl-2-(naphth - 1 - yloxymethyl)-morpholin-5-one as an oil.

EXAMPLE 13

0.33 part of ethyl chloroformate is added to a solution of 1 part of 4-benzyl-2-(2-ethoxyphenoxymethyl)morpholine in 20 parts of benzene, and the mixture is heated under reflux for 17 hours, and then evaporated to dryness. The residue is dissolved in 10 parts of methanol and the solution is added to a solution of 2 parts of potassium hydroxide in 30 parts of methanol. The mixture is heated under reflux for 24 hours, and then evaporated to dryness. The residue is shaken with 100 parts of 10% aqueous hydrochloric acid and 100 parts of ether and the aqueous phase is separated, made alkaline with 45% aqueous sodium hydroxide solution, and extracted with 100 parts of ether. The ethereal extract is washed with water, dried, and evaporated to dryness. The residue is dissolved in 10 parts of ether and the solution is added to a solution of 0.3 part of acetic acid in 10 parts of ether. The mixture is filtered and the solid residue is crystallised from a mixture of methanol and ether. There is thus obtained 2-(2-ethoxyphenoxymethyl)morpholine acetate, M.P. 111–114° C.

The process described above is repeated except that 4-benzyl-2-(o-chlorophenoxymethyl)morpholine is used as starting material in place of 4-benzyl-2-(o-ethoxyphenoxymethyl)morpholine, and that oxalic acid is used in place of acetic acid. There is thus obtained 2-(o-chlorophenoxymethyl)morpholine hydrogen oxalate, M.P. 144–147° C.

The process described above is repeated except that 4-benzyl-2-(o-methylthiophenoxymethyl)morpholine (prepared by processes similar to those generally described in Examples 5 and 8 from o-methylthiophenol) is used as starting material in place of 4-benzyl-2-(o-ethoxyphenoxymethyl)morpholine, and that oxalic acid is used in place of acetic acid. There is thus obtained 2-(o-methylthiophenoxymethyl)morpholine hydrogen oxalate.

The process described above is repeated except that 4-benzyl-2-(o-allylphenoxymethyl)morpholine (prepared by processes similar to those generally described in Examples 5 and 8 from o-allylphenol) is used as starting material in place of 4-benzyl-2-(o-ethoxyphenoxymethyl) morpholine, and that oxalic acid is used in place of acetic acid. There is thus obtained 2-(o-allylphenoxymethyl) morpholine hydrogen oxalate, M.P. 87–94° C.

What we claim is:

1. A compound selected from the group consisting of 2-(o-ethoxyphenoxymethyl)morpholine and the acid-addition salts thereof.

1. A compound selected from the group consisting of 2-(m-methoxyphenoxymethyl)morpholine and the acid-addition salts thereof.

No references cited.

ALEX MAZEL, Primary Examiner

J. TOVAR, Assistant Examiner

U.S. Cl. X.R.

424—248; 260—247.1, 247.7 J